(12) United States Patent
Ogilvie

(10) Patent No.: US 7,676,950 B2
(45) Date of Patent: Mar. 16, 2010

(54) CARPENTERS SQUARE WITH TAPE MEASURE

(76) Inventor: James A Ogilvie, 1252 Amador Ave., Vista, CA (US) 92083

( * ) Notice: Subject to any disclaimer, the term of this patent is extended or adjusted under 35 U.S.C. 154(b) by 76 days.

(21) Appl. No.: 12/141,171

(22) Filed: Jun. 18, 2008

(65) Prior Publication Data
US 2009/0031571 A1    Feb. 5, 2009

Related U.S. Application Data

(63) Continuation-in-part of application No. 11/830,526, filed on Jul. 30, 2007, now Pat. No. 7,484,313.

(60) Provisional application No. 61/046,409, filed on Apr. 19, 2008.

(51) Int. Cl.
*G01B 3/10* (2006.01)
*B43L 7/027* (2006.01)

(52) U.S. Cl. .......................... 33/770; 33/760

(58) Field of Classification Search .................. 33/770, 33/760, 755, 757, 759, 768, 478, 481
See application file for complete search history.

(56) References Cited

U.S. PATENT DOCUMENTS

| 4,642,898 | A | * | 2/1987 | Miller | 33/761 |
| 5,390,425 | A | * | 2/1995 | Gilberts | 33/764 |
| 5,782,007 | A | * | 7/1998 | Harris | 33/768 |
| 5,809,662 | A | * | 9/1998 | Skinner | 33/768 |
| 6,158,139 | A | * | 12/2000 | Bond | 33/768 |
| 6,935,045 | B2 | * | 8/2005 | Cubbedge | 33/770 |
| 7,020,978 | B1 | * | 4/2006 | Nelson | 33/760 |
| 7,062,859 | B1 | * | 6/2006 | Revnell | 33/32.1 |
| 7,219,440 | B2 | * | 5/2007 | Lewis et al. | 33/760 |
| 7,228,644 | B1 | * | 6/2007 | Hellem et al. | 33/760 |
| 7,254,899 | B2 | * | 8/2007 | Marocco et al. | 33/760 |
| 7,484,313 | B1 | * | 2/2009 | Ogilvie | 33/770 |

* cited by examiner

*Primary Examiner*—Christopher W Fulton
(74) *Attorney, Agent, or Firm*—Steven W. Webb

(57) ABSTRACT

An improved adjustable carpenters square is presented, which aids carpenters in marking and measuring work product to be cut or formed. The adjustable square can be set at a variety of angles to enable cut marking. It also possesses an attached measuring tape and a straight edge to combine three useful features in one tool, as well as a press-down tape stop to hold the tape in place.

This invention can be used to scribe a line along a piece of material using the leading edge of the square as a guide instead of using the index finger of one hand, which often results in injury due to slivers from the material being scribed.

4 Claims, 3 Drawing Sheets

CARPENTERS SQUARE WITH TAPE MEASURE

RELATED APPLICATIONS

This application is a Continuation-in-Part of application Ser. No. 11/830,526, now U.S. Pat. No. 7,484,313. This application claims the benefit of Provisional Application 61/046,409 filed Apr. 19, 2008, now abandoned.

FIELD OF THE INVENTION

The present invention relates to apparatuses for measuring a work piece, providing means for layout markings, combined with a retractable tape measure.

BACKGROUND OF THE INVENTION

The inventor of the present invention has submitted a previous patent application for a similar device titled Adjustable Carpenter's Square With Tape Measure. The present invention is a significant improvement over the previous device and possesses several important new features.

To prepare wood or other materials for cutting or routing, the workman uses a tape measure to measure the piece, a square for making a reliable mark, and a straight edge to draw the mark. A retractable tape measure, usually metal, is used to set the marks based on length from one end of the piece. A workman often has three or more instruments or tools to help with these tasks, including a straight edge, a retractable tape, a square and a marker (pencil or pen).

Combining a set of these tools into a single item that can be easily carried has been approached in the art, for example U.S. Pat. No. 5,787,599 to Clifton, which teaches a combination square and tape measure, with an embedded protractor to set the square at various angles to help in drawing diagonal lines. Other patents such as U.S. Pat. No. 6,226,885 to Korich and U.S. Pat. No. 5,782,007 to Harris teach similar tool sets, with variations.

There is still a need for a combination tool that supports the three functions of measuring, marking, and drawing that is reliable and sturdy. There is also a need for such a device that possesses the additional features of tape stopping with a pressure button and has a slanted deck for the tape to improve the contact of the tape restraint end with the edge of the material. The present invention also has an improved ratcheting mechanism to control the arms of the square.

SUMMARY OF THE INVENTION

The present invention consists of a simple piece of rigid, hard stock, such as aluminum, steel, or plastic, that has a frame that will accept a retractable metal tape holder at one end, a flat, slanted deck that permits the tape to be extended at an angle to the piece being measured, a straight edge on its underside, and an adjustable t-square that can be set at a plurality of predetermined angles. The square arms are locked in place with a set of ball bearings and rotating holes and can be easily moved.

The present invention meets the need for a combined hand tool that can perform the indicated functions, can be carried on a belt, is lightweight and durable. The frame at the end of the device will accept almost all off-the-shelf metal tape measures, which are mounted by removing the metal clip on the side of the tape, placing the tape in the frame, and then reattaching the metal clip through the slot in the side of the frame. The adjustable T-square can be locked firmly at various useful angles and help control the marking function without the use of a protractor.

OBJECTS OF THE INVENTION

It is an object of the present invention to provide a measuring and marking tool utilizing a conventional retractable tape measure in combination with a straightedge and a T-square.

It is a further object of the invention to provide such a tool made from simple materials requiring the minimum amount of machining and assembly.

It is a further object of the invention to provide such a tool capable of marking materials at a variety of preset, useful angles.

It is a further object of the invention to provide such a tool with the capability of accepting many off-the-shelf metal carpenters tape measures.

It is a further object of the invention to provide such a tool with an improved tape deck, slanted so that the catch at the end of the tape can more easily engage the work piece.

DETAILED DESCRIPTION OF THE INVENTION

Figure 1:
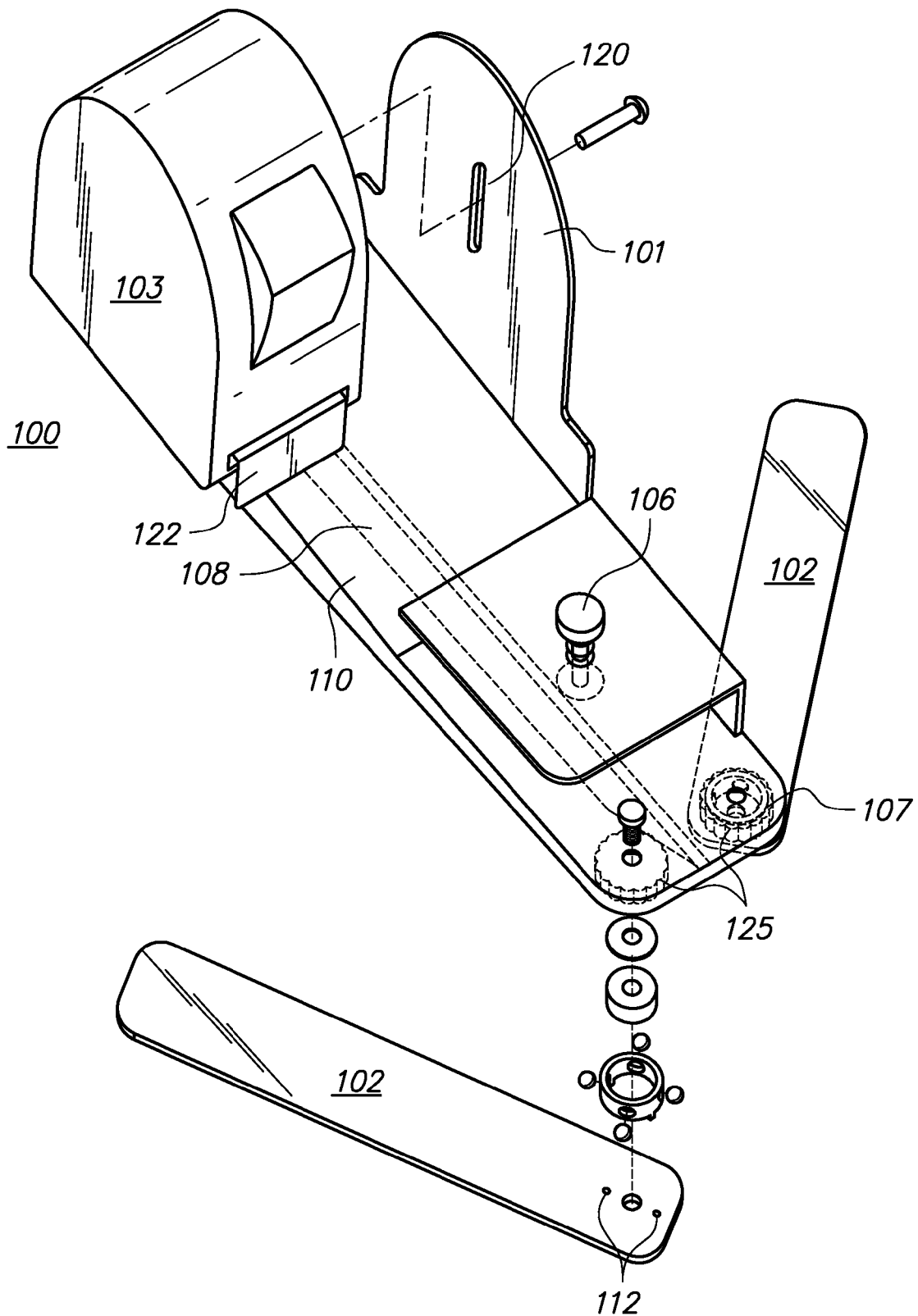
FIG. 1. Exploded perspective view of the invention
FIG. 2. Exploded perspective view of the invention
FIG. 3. Top view of the ratchet mechanism
FIG. 4. Side view of the ratchet frame
FIG. 5. Bottom view of the invention
FIG. 6. Front view of the invention

As shown in FIG. 1, the invention 100 in its preferred embodiment is comprised of a tape holder 101, a tape deck 110, a commercial off-the-shelf (COTS) retractable tape cassette 103, two square arms 102, a straight edge 108, two square arm ratchet assemblies 107, and a press-down tape stop 106.

Figure 2:
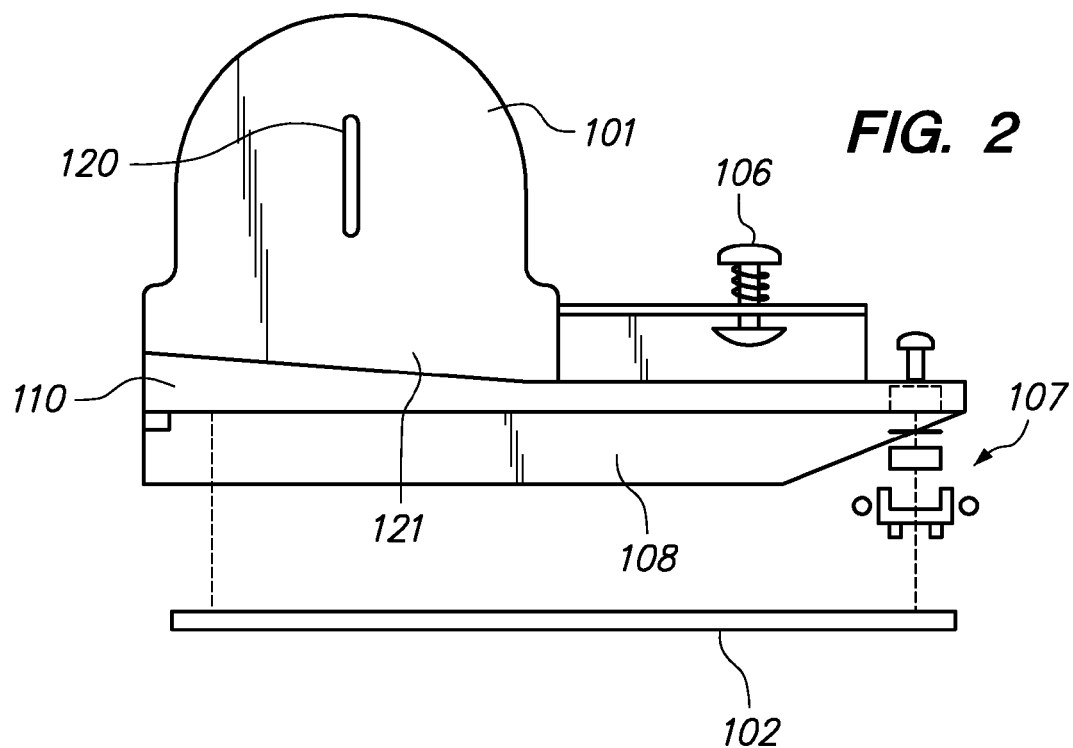

The tape holder 101 possesses a tape cassette attachment slot 120 whereby the COTS tape cassette 103 is attached to the tape holder 101. The measuring tape is extended from the COTS tape cassette 103 and extends past the edge of the tape deck 110, able to be pulled further out and used to measure any product to be cut or fastened. As seen in FIG. 2. The tape deck 110 possesses an angle 121 to the straight edge 108 that forms the underside of the tape holder 101. The measuring tape will retract and stop such that the bent end 122 of the measuring tape 103 encounters the end of the tape deck 110.

The underside of the invention 100 possesses a straight edge 108 extending the length of the tape holder 110.

Figure 3:
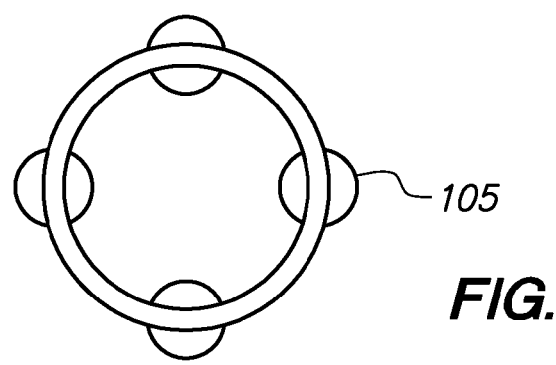
Figure 4:
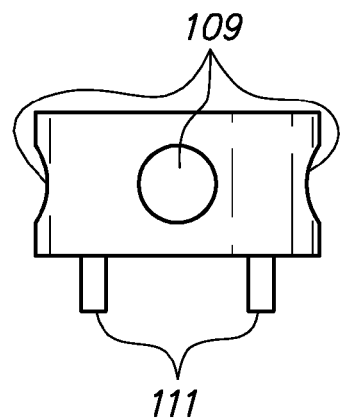
Figure 5:
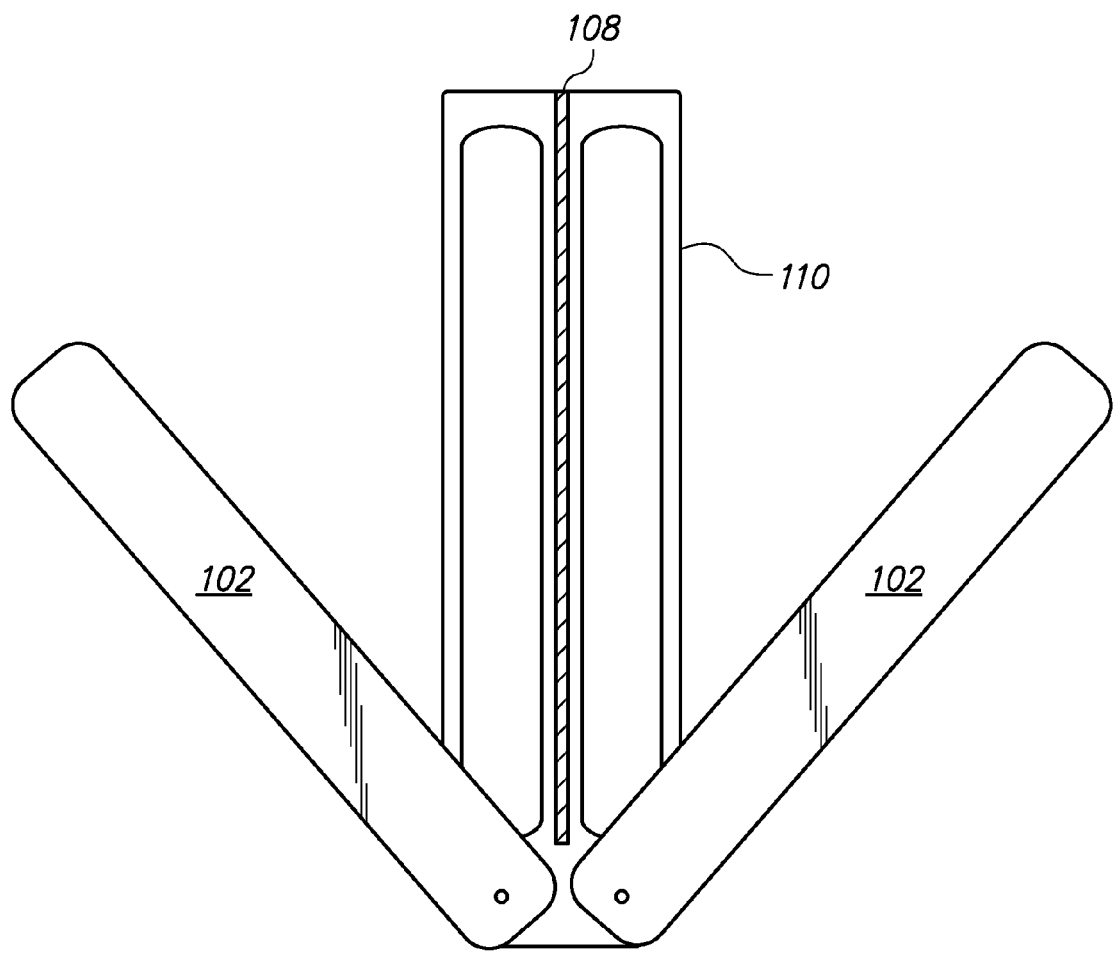

The square arms 102 are attached to the tape deck 110 by means of two square arm ratchet assemblies 107, as shown in FIG. 2, FIG. 3, and FIG. 4, and are permitted to rotate easily. The square arms 102 are adjustable in their rotation by means of the precut ratchet holes 125. A plurality of flexible bearings 105 fitted to the guide holes 109 permit the arms to be positioned at each of the available angles provided by the precut ratchet holes 125, and when an arm 102 is moved forcibly, the flexible bearings 105 are pushed in until the next angle in the ratchet hole 125 is presented, whereupon the bearing 105 pops out to fill it, holding the square arm 102 in place.

Figure 6:
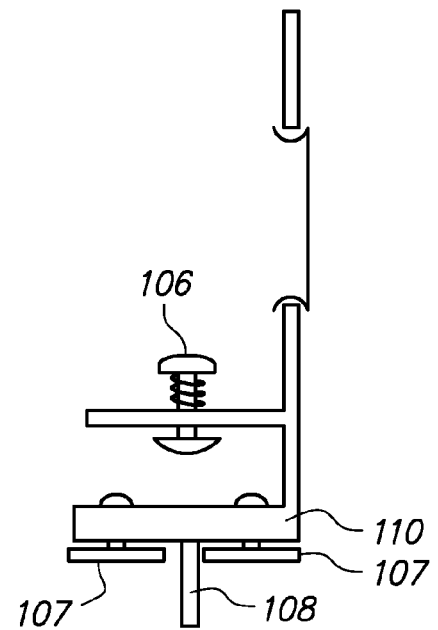

In FIG. 1, FIG. 2. and FIG. 6., a press-down tape stop 106 is shown, that when pressed by a thumb intercepts the metal tape from the COTS retractable tape cassette 103 and presses the tape against the top of the tape deck 110.

Although the invention has been described as a preferred embodiment, equivalent features may be employed and substitutions made within this specification without departing from the scope of the invention as recited in the claims.

What is claimed is:

1. An adjustable carpenters square, the carpenters square comprised of a tape holder and a commercial off-the-shelf (COTS) tape cassette, the COTS tape cassette possessing a flexible metal tape, the tape holder possessing an upper side and an under side, the tape holder an elongated rectangular piece of material, the tape holder upper side possessing a tape cassette holder to which the COTS tape cassette is attached removably, the tape holder upper side also possessing a break angle in its length such that the COTS tape cassette is held at an angle to the remainder of the tape holder upper side, the tape holder upper side also possessing a press-down tape stop at the end of the tape holder away from the tape cassette holder, the press down tape stop a device that when pressed by the thumb intercepts the flexible metal tape and stops it from moving, the tape holder under side possessing a straight edge, the tape holder under side possessing two adjustable arms, each arm attached at the end of the tape holder underside away from the tape cassette holder, each adjustable arm attached rotatably to the tape holder underside by means of a cylindrical pivot point, the two cylindrical pivot points placed on either side of the straight edge, the cylindrical pivot holes each possessing a plurality of ratchet angles punched through their material, the positioning of the ratchet angles at regular angular displacements around the cylindrical pivot hole, each cylindrical pivot hole containing removable within it a cylindrical pivot ratchet, the cylindrical pivot ratchets possessing a plurality of flexible bearings and flexible bearing guide holes, each flexible bearing placed within the cylindrical pivot ratchet such that the flexible bearing will push through a flexible bearing guide holes when the adjustable arm is positioned at a one of the preselected ratchet angles within the cylindrical pivot hole, the flexible bearing filling each ratchet angle in turn as the adjustable arm is rotated.

2. An adjustable carpenters square as in claim 1 where the material comprising the tape holder is selected from the list of steel, aluminum, or plastic.

3. A method of using an adjustable carpenters square as in claim 1 or claim 2, the method comprised of the steps of obtaining a piece of material to measure, extending the flexible measuring tape from the end of the tape cassette through the press-down tape stop past the end of the tape holder to the end of the piece of material, hooking the end of the tape over the end of the piece of material, laying the adjustable carpenters square along the piece of material and extending the tape by pulling the adjustable carpenters square away from the end of the piece of material to the other end of the material, marking the piece of material at an appropriate point along the flexible measuring tape, allowing the flexible measuring tape to retract until the end of the tape hooks over the end of the tape holder.

4. A method of using an adjustable carpenters square as in claim 1, the method comprised of the steps of opening up one of the adjustable arms, comprised of the substeps of rotating the adjustable arm around the cylindrical pivot hole, positioning the adjustable arm such that one of the plurality of flexible bearings pushes up through one of the flexible bearing guide holes and fills a ratchet angle, placing the adjustable arm alongside an edge of the piece of material to be measured such that the straight edge extends across the piece of material at the desired angle, drawing a line along the straight edge from one side of the material to the other.

* * * * *